(12) United States Patent
Jang et al.

(10) Patent No.: US 12,231,771 B2
(45) Date of Patent: Feb. 18, 2025

(54) SENSOR SHIFTING MODULE AND CAMERA MODULE HAVING THE SAME

(71) Applicant: SAMSUNG ELECTRO-MECHANICS CO., LTD., Suwon-si (KR)

(72) Inventors: Su Bong Jang, Suwon-si (KR); Sang Jong Lee, Suwon-si (KR); Hee Soo Yoon, Suwon-si (KR); Tae Ho Yun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 120 days.

(21) Appl. No.: 17/968,330

(22) Filed: Oct. 18, 2022

(65) Prior Publication Data

US 2023/0164438 A1 May 25, 2023

(30) Foreign Application Priority Data

Nov. 23, 2021 (KR) .................. 10-2021-0162475

(51) Int. Cl.
*H04N 23/68* (2023.01)
*H04N 23/51* (2023.01)
*H04N 23/54* (2023.01)
*H04N 23/55* (2023.01)

(52) U.S. Cl.
CPC .......... *H04N 23/687* (2023.01); *H04N 23/51* (2023.01); *H04N 23/54* (2023.01); *H04N 23/55* (2023.01)

(58) Field of Classification Search
CPC ...... H04N 23/687; H04N 23/51; H04N 23/54; H04N 23/55

USPC .................................................... 348/208.11
See application file for complete search history.

(56) References Cited

U.S. PATENT DOCUMENTS

| | | | |
|---|---|---|---|
| 10,890,734 B1 | 1/2021 | Sharma et al. | |
| 11,048,147 B2 | 6/2021 | Sharma | |
| 11,885,977 B2 | 1/2024 | Seo et al. | |
| 2006/0092311 A1* | 5/2006 | Hartlove | G02B 7/08 348/340 |
| 2018/0321503 A1 | 11/2018 | Brown | |
| 2021/0080807 A1* | 3/2021 | Sharma | H04N 23/683 |

(Continued)

FOREIGN PATENT DOCUMENTS

| | | |
|---|---|---|
| CN | 108141541 A | 6/2018 |
| CN | 112702534 A | 4/2021 |
| CN | 112805620 A | 5/2021 |

(Continued)

OTHER PUBLICATIONS

Korean Office Action Issued on Feb. 22, 2023, in Counterpart Korean Patent Application No. 10-2021-0162475 (7 Pages in English, 5 Pages in Korean).

(Continued)

*Primary Examiner* — Joel W Fosselman
(74) *Attorney, Agent, or Firm* — NSIP Law

(57) ABSTRACT

A camera module includes a housing, a carrier movable in a first direction and disposed in the housing, a first body movably disposed inside the carrier, an image sensor disposed on the first body and having an imaging surface facing in the first direction, and supporting balls disposed between the carrier and the first body. The first body moves perpendicular to the first direction in a state supported by the supporting balls with respect to the carrier.

20 Claims, 14 Drawing Sheets

(56) References Cited

U.S. PATENT DOCUMENTS

2021/0173223 A1    6/2021   Seo et al.
2022/0091397 A1*   3/2022   Brodie .............. G02B 13/0065

FOREIGN PATENT DOCUMENTS

| CN | 112839176 A | 5/2021 |
| CN | 113050341 A | 6/2021 |
| CN | 113126232 A | 7/2021 |
| KR | 10-2017-0005399 A | 1/2017 |
| KR | 10-2021-0073324 A | 6/2021 |

OTHER PUBLICATIONS

Chinese Office Action issues on Dec. 12, 2024, in counterpart Chinese Patent Application No. 202211439539.8 (5 pages in English, 8 pages in Chinese).

\* cited by examiner

SENSOR SHIFTING MODULE AND CAMERA MODULE HAVING THE SAME

CROSS-REFERENCE TO RELATED APPLICATIONS

This application claims the benefit under 35 USC 119(a) of Korean Patent Application No. 10-2021-0162475 filed on Nov. 23, 2021, in the Korean Intellectual Property Office, the entire disclosure of which is incorporated herein by reference for all purposes.

BACKGROUND

1. Field

The present disclosure relates to a method for implementing optical image stabilization by driving an image sensor.

2. Description of the Background

With the development of communications technology, mobile devices such as smartphones may be widely distributed, and accordingly, demand for the functions of a camera in mobile devices may be gradually increasing. For example, a camera included in a mobile device may be manufactured to provide advanced shooting functions (e.g., an autofocusing function, antishake function, and the like) such as may be implemented in a digital single-lens reflex camera (DSLR camera), despite the small size thereof.

The image stabilization (IS) function, for example, the hand-shake correction function, is a function preventing image blurring occurring when the camera is shaken during the exposure time, and is necessary when shooting in low-light environments in which there is a large amount of shaking and the exposure time is long. Image stabilization is largely divided into Digital Image Stabilization (DIS), Electronic IS (EIS), and Optical IS (OIS). Of these, OIS (Optical IS) may fundamentally prevent image deterioration caused by shaking by moving the lens or image sensor in a direction perpendicular to the optical axis to correct the optical path. Since a mechanical actuator is required for OIS, the implementation of the device may be complicated but provide the greatest compensation to performance for the trade-off of high cost.

Since the lens barrel contains an optical system therein, a relatively large amount of force may be required to drive the lens barrel. Since the image sensor is relatively light, it may be advantageous to drive the image sensor to implement an image stabilization function with a relatively small amount of force.

On the other hand, a camera employed in a mobile device mainly provides a shake compensation function preventing only the shake in a direction perpendicular to the optical axis when taking a picture. However, there may be cases where moving the image sensor in more various directions may be necessary to compensate for shake in a more dynamic environment such as cases of video recording with mobile devices.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing, a carrier movably disposed in the housing in a first direction, a first body movably disposed inside the carrier, an image sensor disposed on the first body and having an imaging surface facing in the first direction, and supporting balls disposed between the carrier and the first body. The first body moves perpendicular to the first direction in a state supported by the supporting balls with respect to the carrier.

The camera module may further include an autofocus driver including an autofocus actuator moving the carrier in the first direction relative to the housing, and a ball member disposed between the carrier and the housing.

The autofocus actuator may include an autofocus coil coupled to one of the housing and the carrier, and an autofocus magnet coupled to the other one of the carrier and the housing and facing the autofocus coil in a direction perpendicular to the first direction.

The camera module may further include a yoke disposed on one side of the autofocus coil.

The autofocus actuator may be disposed below the carrier, and include an autofocus coil coupled to one of the housing and the carrier, and an autofocus magnet coupled to the other of the housing and the carrier and facing the autofocus coil in the first direction.

The camera module may further include a first elastic member disposed between the carrier and the housing, wherein the ball member may be disposed on one side of the carrier, and the first elastic member may be disposed on the other side of the carrier to push the carrier toward the ball member.

The camera module may further include a second elastic member disposed between the lower portion of the carrier and the housing to support the carrier in the first direction.

The camera module may further include a second body movably disposed on the first body, wherein the image sensor may be disposed on the second body, a first driver for moving the first body in a direction perpendicular to the first direction with respect to the carrier, a second driver for rotating the second body with respect to the carrier about an axis parallel to the first direction, and a third driver rotating the second body with respect to the first body about an axis perpendicular to the first direction.

The third driver may include a tilt guide ball disposed between the first body and the second body, wherein the tilt ball may provide a tilt center of the second body with respect to the first body.

The first body may be disposed between the lower surface of the second body and the bottom surface of the carrier.

The first driver may include a first actuator, and the first actuator may include a first driving magnet disposed on the second body, and a first driving coil disposed on the carrier in a direction perpendicular to the first direction and facing the first driving magnet.

The second driver may include a second actuator, wherein the second actuator may include a second driving magnet disposed on the second body and a second driving coil disposed in the carrier to face the second driving magnet in a direction perpendicular to the first direction.

The second body may have four side surfaces forming a quadrangle, and the first driving magnet and the second driving magnet may be respectively disposed on different side surfaces of the four side surfaces.

The second body may have a first side and a second side forming a corner, and the second driving magnet may be disposed on the first side or the second side and may be located close to the corner.

The third driver may include a third actuator, wherein the third actuator may include a third driving magnet disposed on the second body, and a third driving coil disposed in the carrier to face the third driving magnet in the first direction.

The third driving magnet may be the first driving magnet or the second driving magnet.

The third driver may include a first magnetic member and a second magnetic member disposed on the first body and the second body, respectively, facing each other in the first direction.

In another general aspect, a sensor shifting module includes a carrier, supporting balls disposed on the carrier, a first body disposed on the supporting balls and movable in a plane, a tilt guide ball disposed on the first body, a second body disposed on the tilt guide ball and rotatable about a first direction perpendicular to the plane and rotatable about second and third directions perpendicular to the first direction, and an image sensor disposed on the second body and having an imaging surface facing in the first direction.

A camera module may include the sensor shifting module, a housing, and a ball member, wherein the carrier may be movably disposed in the housing in the first direction, and the ball member may be disposed between the carrier and the housing.

The camera module may further include an autofocus actuator configured to move the carrier in the first direction relative to the housing, a first actuator including a first magnet and configured to move the first body in a direction perpendicular to the first direction with respect to the carrier, a second actuator including a second magnet and configured to rotate the second body with respect to the carrier about an axis parallel to the first direction, and a third actuator including one or more of the first magnet and the second magnet and configured to rotate the second body with respect to the first body about an axis perpendicular to the first direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
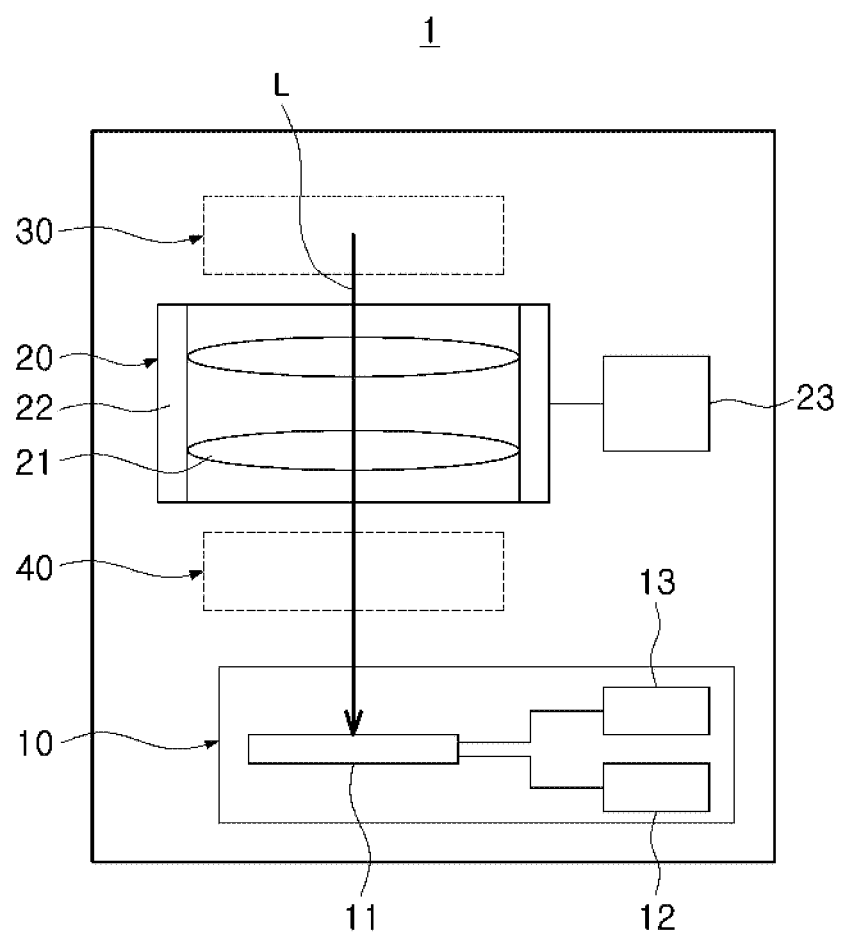
FIG. 1 schematically illustrates components constituting a camera module according to an example embodiment.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is noted that use of the term "may" with respect to an example or embodiment, e.g., as to what an example or embodiment may include or implement, means that at least one example or embodiment exists in which such a feature is included or implemented while all examples and examples are not limited thereto.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various manners as will be apparent after gaining an understanding of this disclosure. Further, although the examples described herein have a variety of configurations, other configurations are possible as will be apparent after gaining an understanding of this disclosure.

In this document, the X-direction, Y-direction, and Z-direction indicate a direction parallel to the X-axis, a direction parallel to the Y-axis, and a direction parallel to the Z-axis illustrated in the drawings, respectively. In addition, unless otherwise stated, the X direction is a concept including both the +X-axis direction and the −X-axis direction, and this is also applied to the Y-direction and the Z-direction.

When two directions (or axes) are parallel to or perpendicular to each other in this document, it also includes cases in which the two directions (or axes) are substantially parallel to each other or substantially perpendicular to each other, respectively. For example, the first axis and the second axis being perpendicular to each other indicates that the first axis and the second axis form an angle of 90 degrees or close to 90 degrees.

Paragraphs beginning with "in one/an example" in this document do not necessarily refer to the same examples. The specific features, structures, or characteristics may be combined in any suitable manner consistent with the present disclosure.

In this document, "configured to" indicates that a component includes a structure necessary to implement a certain function.

An aspect of the present disclosure may enable a camera to provide effective optical image stabilization with little power. In addition, an object of the present disclosure may provide an autofocusing control function and an excellent shake correction function by driving an image sensor in various directions.

1. Camera Module

FIG. 1 schematically illustrates components constituting a camera module 1 according to an example embodiment.

In one example, a camera module 1 includes a lens module 20 including at least one lens 21 and a lens barrel 22 accommodating the at least one lens 21, and an image sensor 11. Light L passes through the lens module 20 and hits an imaging plane of the image sensor 11. The camera module 1 may include a first AF driver 23 that moves the lens module 20 in the optical axis direction to adjust the focal length. The first AF driver 23 may include, for example, a coil and a magnet facing each other. The coil may be fixedly coupled to the lens module 20, the magnet may be coupled to a fixed body such as a housing, and electromagnetic interaction between the coil and the magnet may cause the lens module 20 to move in the optical axis direction.

The focus adjustment may be implemented by driving the image sensor 11 instead of the lens module 20. For example, a second AF driver 13 may move the image sensor 11 in the optical axis direction. An example of the second AF driver 13 will be described with reference to FIGS. 9 and 10.

In one example, the camera module 1 may further include an optical element in addition to the lens module 20 and the image sensor 11. In one example, the camera module 1 may include two or more lens modules. For example, a first optical element 30 and/or a second optical element 40 may be a lens module distinct from the lens module 20.

In an example, the camera module 1 may include a sensor shifting module 10. The sensor shifting module 10 may include components required for implementing an OIS function or an AF function by driving the image sensor 11. For example, the sensor shifting module 10 may include the image sensor 11, and a portion of one or both of an OIS driver 12 and the second AF driver 13 for driving the image sensor 11. The sensor shifting module 10 may refer to only the OIS driver 12 excluding the image sensor 11.

In one example, the camera module 1 may further include an optical element in addition to the lens module 20 and the image sensor 11. In one example, the camera module 1 may include two or more lens modules. For example, a first optical element 30 and/or a second optical element 40 may be a lens module distinct from the lens module 20.

In an example, the camera module 1 may include an optical path changing element disposed in front of the lens module 20. For example, the first optical element 30 may be a prism or a mirror. In another example, the optical path changing element may be disposed between the image sensor 11 and the lens module 20. For example, the second optical element 40 may be a prism or a mirror.

Hereinafter, a sensor shifting module 100 described with reference to FIGS. 2A to 8 may be applied to the camera module 1 of FIG. 1.

2. Sensor Shift

Figure 2A:
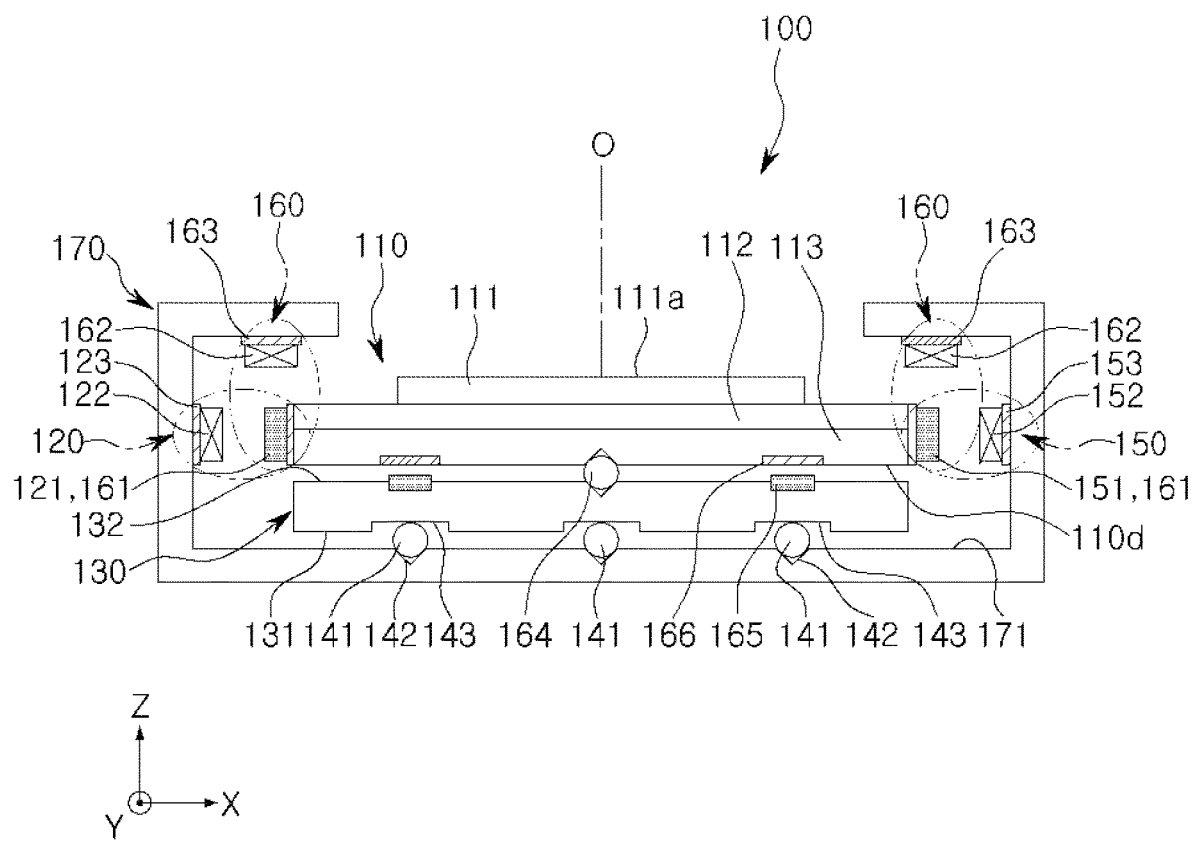
FIG. 2A illustrates a sensor shifting module according to an example embodiment.
Figure 2B:
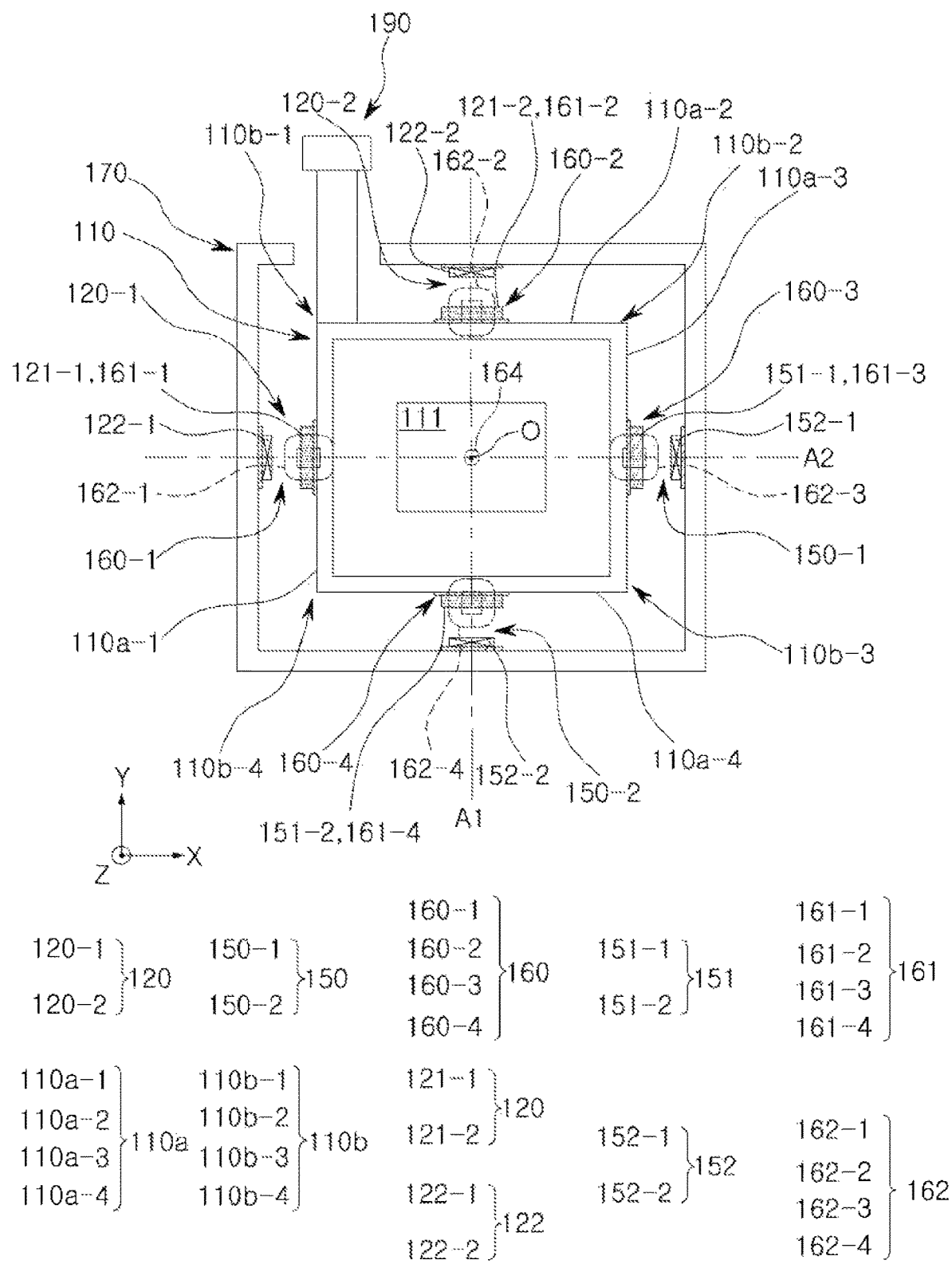
FIG. 2B illustrates actuators constituting an OIS driver according to an example embodiment.
Figure 2C:
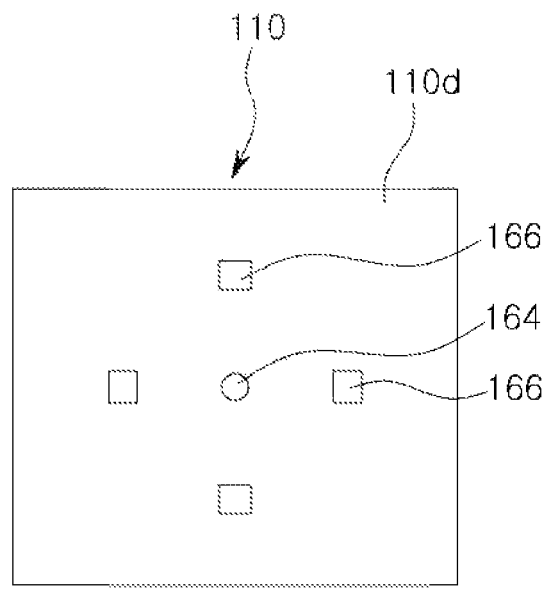
FIG. 2C illustrates a lower surface of the first movable body according to an example embodiment.

FIG. 2A illustrates a sensor shifting module 100 according to an example embodiment. FIG. 2B illustrates actuators constituting an OIS driver according to an example embodiment. FIG. 2C illustrates a pulling means between the first movable body and the fixed body in one example embodiment.

The sensor shifting module 100 may include an OIS driver. The OIS driver may include at least one of a first OIS driver, a second OIS driver, and a third OIS driver, which will be described later. The first OIS driver moves the image sensor 111 in a direction perpendicular to the optical axis, the second OIS driver rotates the image sensor 111 based on an axis parallel to the optical axis, and the third OIS driver may rotate the image sensor 111 based on an axis perpendicular to the optical axis.

The OIS driver 12 of the camera module 1 of FIG. 1 may include one or more of the first OIS driver, the second OIS driver, and the third OIS driver.

2.1. Translation+Rolling OIS 2.1.1. Structure

The sensor shifting module 100 may include a first OIS driver for driving the image sensor 111. In an example, the sensor shifting module 100 includes a second movable body 110 including an image sensor 111 and a first movable body 130 for carrying the second movable body 110. The second movable body 110 may be movably disposed inside the first movable body 130. The second movable body 110 is a component that moves together with the image sensor 111. For example, the second movable body 110 may include a sensor substrate 112 on which the image sensor 111 is mounted and a sensor holder 113 coupled to the sensor substrate 112. The second movable body 110 may move in a direction perpendicular to the optical axis with respect to the first movable body 130 by the first OIS driver.

Referring to FIG. 2B, the signal of the image sensor 111 may be transmitted to another electronic component (e.g., an image signal processor (ISP)) through the sensor substrate 112 and the connector 190.

In an example, the sensor shifting module 100 may include a first OIS driver that moves the image sensor 111 in a direction perpendicular to the optical axis O. Through the first OIS driver, the second movable body 110 may move in a direction orthogonal to the direction in which the imaging surface 111*a* of the image sensor 111 faces with respect to the first movable body 130. In an example, the first OIS driver may compensate for shaking in a direction perpendicular to the optical axis O of the camera module 1 or the electronic device on which the image sensor 111 is mounted. In an example, the first OIS driver may move the image sensor 111 in a first direction and a second direction perpendicular to the optical axis O. The first direction and the second direction may cross each other. For example, the first OIS driver may move the second movable body 110 in the X direction and/or the Y direction perpendicular to the Z axis, and accordingly, the shake in the X direction and/or the shake in the Y direction may be corrected.

In this document, the direction in which the imaging surface 111*a* of the image sensor 111 faces may be referred to as an optical axis O direction. For example, the second movable body 110 may move in a direction perpendicular to the optical axis O with respect to the first movable body 130. In the drawings of the present disclosure, the optical axis (O) is illustrated parallel to the Z axis, and thus the Z direction refers to a direction parallel to the optical axis (O). In addition, the X direction or the Y direction refers to a direction perpendicular to the optical axis (O). For example, in the present disclosure, moving the second movable body 110 in the X direction may be understood as moving the second movable body 110 in a direction perpendicular to the optical axis O. As another example, as illustrated in FIG. 2A, that the first driving magnet 121 and the first driving coil 122 face each other in the X direction may be understood that the first driving magnet 121 and the first driving coil 122 face each other in a direction perpendicular to the optical axis O. In addition, the X direction or the Y direction is an example of two directions perpendicular to the optical axis and intersecting each other, and in the present disclosure, the X direction and the Y direction may be understood as two directions perpendicular to the optical axis O and intersecting each other.

In an example, the sensor shifting module 100 may include a second OIS driver that rotates the image sensor 111 based on an axis parallel to the optical axis O. Through the second OIS driver, the second movable body 110 may rotate with respect to the fixed body 170 based on an axis parallel to the direction in which the imaging surface 111*a* of the image sensor 111 faces. In an example, the second OIS driver may correct rotation of the camera module 1 or the electronic device on which the image sensor 111 is mounted based on an axis parallel to the optical axis O.

2.1.2 First Actuator (Translation)

Referring to FIGS. 2A and 2B, in an example, the first OIS driver includes a first actuator 120 disposed between the fixed body 170 and the second movable body 110. In an example, the first actuator 120 may include a first driving magnet 121 coupled to the second movable body 110, and a first driving coil 122 coupled to the fixed body 170. For example, referring to FIG. 2A, in one example, the first driving coil 122 and the first driving magnet 121 are combined with the inner side of the fixed body 170 and one side of the second movable body 110, respectively. The first driving magnet 121 and the first driving coil 122 face each other in a direction perpendicular to the optical axis O (e.g., the X direction or the Y direction). Electromagnetic interaction between the first driving magnet 121 and the first driving coil 122 causes the second movable body 110 to move in a direction perpendicular to the optical axis O with respect to the first movable body 130.

The first OIS driver may include a plurality of first actuators 120, and each of the first actuators 120 may include a first driving magnet 121 and a first driving coil 122. For example, the first OIS driver may include the 1-1 actuator 120-1 disposed on the first side surface 110*a*-1 of the second movable body 110, and the 1-2 actuator 120-2 disposed on the second side surfaces 110*a*-2 of the second movable body 110. Referring to FIG. 2B, the 1-1 actuator 120-1 includes a 1-1 driving magnet 121-1 and a 1-1 driving coil 122-1. The 1-2 actuator 120-2 includes a 1-2 driving magnet 121-2 and a 1-2 driving coil 122-2.

In an example, the first OIS driver may further include a yoke 123 disposed on one side of the first driving magnet 121 and/or the first driving coil 122. The yoke 123 attached to one side of the first driving coil 122 allows the magnetic field generated in the first driving coil 122 to be concentrated in a direction toward the first driving magnet 121. Since the yoke 123 is disposed on one side of the first driving coil 122, it is possible to prevent or minimize the magnetic field generated by the first driving coil 122 from affecting other electronic components. The yoke 123 attached to one side of the first driving magnet 121 allows the magnetic field generated in the first driving magnet 121 to be concentrated in a direction toward the first driving coil 122.

In this document, the first driving coil 122 and the first driving magnet 121 are described as being coupled to the fixed body 170 and the second movable body 110, respectively, but this is for convenience of description, and in another example, the first driving coil 122 and the first driving magnet 121 may be coupled to the second movable body 110 and the fixed body 170, respectively.

2.1.3 Second Actuator (Rolling)

Referring to FIGS. 2A and 2B, in an example, the second OIS driver includes a second actuator 150 disposed between the fixed body 170 and the second movable body 110. In an example, the second actuator 150 may include a second driving magnet 151 coupled to the second movable body 110, and a second driving coil 152 coupled to the fixed body 170. For example, referring to FIG. 2A, in one example, the second driving coil 152 and the second driving magnet 151 are coupled to the inner surface of the fixed body 170 and one side of the second movable body 110, respectively. The second driving magnet 151 and the second driving coil 152 face each other in a direction perpendicular to the optical axis O. The electromagnetic interaction between the second driving magnet 151 and the second driving coil 152 may rotate the second movable body 110 with respect to the first movable body 130 about an axis parallel to the optical axis O.

The second OIS driver may include a plurality of second actuators 150, and each of the second actuators 150 may include a second driving magnet 151 and a second driving coil 152. For example, the second OIS driver may include a 2-1 actuator 150-1 disposed on the third side surface 110a-3 of the second movable body 110, and a 2-2 actuator 150-2 disposed on the fourth side surface 110a-4 of the second movable body 110. Referring to FIG. 2B, a 2-1 actuator 150-1 includes a 2-1 driving magnet 151-1 and a 2-1 driving coil 152-1. The 2-2 actuator 150-2 includes a 2-2 driving magnet 151-2 and a 2-2 driving coil 152-2.

In an example, the second OIS driver may further include a yoke 153 disposed on one side of the second driving magnet 151 and/or the second driving coil 152. The yoke 153 attached to one side of the second driving coil 152 allows the magnetic field generated in the second driving coil 152 to be concentrated in a direction toward the second driving magnet 151. As the yoke 153 is disposed on one side of the second driving coil 152, the magnetic field generated by the second driving coil 152 may be prevented from affecting other electronic components or the influence thereof may be significantly reduced. The yoke 153 attached to one side of the second driving magnet 151 allows the magnetic field generated by the second driving magnet 151 to be concentrated in a direction toward the second driving coil 152.

In this document, the second driving coil 152 and the second driving magnet 151 are described as being coupled to the fixed body 170 and the second movable body 110, respectively, but this is for convenience of description, and in another example, the second driving coil 152 and the second driving magnet 151 may be coupled to the second movable body 110 and the fixed body 170, respectively.

2.1.4. Ball Guide/Support

The first movable body 130 (or the second movable body 110) may move on a plane perpendicular to the optical axis O by the first OIS driver or the second OIS driver. This movement of the first movable body 130 may be supported by the supporting balls 141. The supporting balls 141 may partially constitute the first OIS driver or the second OIS driver.

The second movable body 110 may be rotated based on an axis perpendicular to the optical axis O by the third OIS driver. This movement of the second movable body 110 may be supported by the tilt guide ball 164.

The first movable body 130 is disposed between the second movable body 110 and the fixed body 170. For example, the first movable body 130 may be disposed between the lower surface 110d of the second movable body 110 and the bottom surface 171 of the fixed body 170. The first movable body 130 may guide or support the movement of the second movable body 110. The second movable body 110 is rotationally supported by the tilt guide ball 164 seated on the first movable body 130. The first movable body 130 may be disposed on the bottom surface 171 of the fixed body 170, and may move in a plane perpendicular to the optical axis (O), and accordingly, the second movable body 110 may move on a plane perpendicular to the optical axis O with respect to the fixed body 170.

Figure 3:
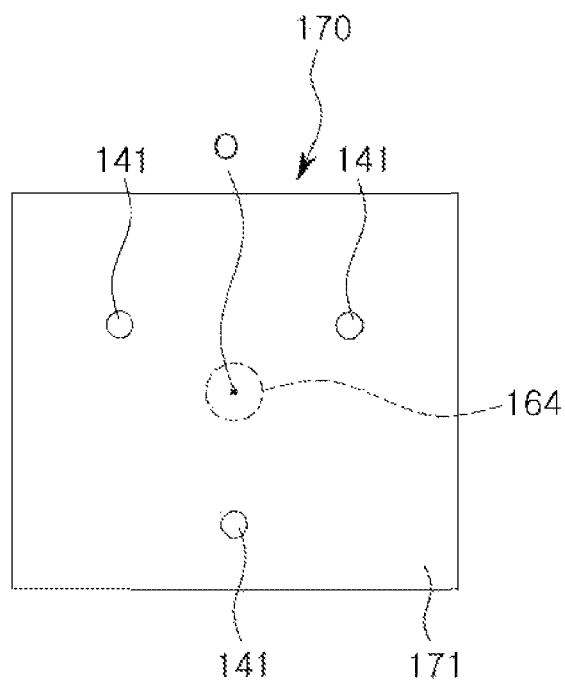
FIG. 3 illustrates the arrangement of the supporting balls in one example embodiment.

FIG. 3 illustrates an arrangement of the supporting balls 141 in one example embodiment. The supporting balls 141 are disposed between the lower surface 131 of the first movable body 130 and the bottom surface 171 of the fixed body 170. For example, referring to FIG. 3, three supporting balls 141 may be disposed on the bottom surface 171 of the fixed body 170. The first movable body 130 and the fixed body 170 may include grooves for partially accommodating the supporting balls 141. For example, the first groove 142 and the second groove 143 may be disposed in the fixed body 170 and the first movable body 130, respectively.

At least one of the first groove 142 and the second groove 143 may be configured such that the supporting ball 141 may move in a predetermined range in a direction perpendicular to the optical axis O with respect to the fixed body 170 or the first movable body 130. For example, the second groove 143 may be formed to contact the supporting ball 141 at one point, and the supporting ball 141 may roll or slide within a predetermined range within the second groove 143. Accordingly, the first movable body 130 or the second movable body 110 may move on a plane perpendicular to the optical axis O with respect to the fixed body 170 by the first OIS driver or the second OIS driver.

In an example, the first OIS driver may include a first position sensor capable of measuring how much the second movable body 110 has moved in a direction perpendicular to the optical axis O. The first position sensor may be a Hall sensor or a magnetoresistive sensor. In an example, the first position sensor may be disposed inside the first driving coil 122 to face the first driving magnet 121. The inside of the coil refers to an empty space corresponding to the winding center of the coil.

In another example, the first OIS driver includes a sensing magnet distinguished from the first driving magnet 121, and the first position sensor may be disposed to face the sensing magnet. For example, the first position sensor and the sensing magnet may be disposed to face the fixed body 170 or the first movable body 130 in the optical axis direction (e.g., in the Z direction), respectively.

In an example, the first OIS driver may include a second position sensor capable of measuring how much the second movable body 110 rotates along an axis parallel to the optical axis O. The second position sensor may be a Hall sensor or a magnetoresistance sensor. In an example, the second position sensor may be disposed inside the second driving coil 152 to face the second driving magnet 151.

In another example, the second OIS driver includes a sensing magnet distinguished from the second driving magnet 151, and the second position sensor may be disposed to face the sensing magnet. For example, the second position sensor and the sensing magnet may be disposed to face the fixed body 170 or the first movable body 130 in the optical axis direction (e.g., in the Z direction), respectively.

The second position sensor may be the same component as the first position sensor. For example, one position sensor may be used to measure both translational motion (e.g., motion by the first OIS driver) and rotational motion (e.g., motion by the second OIS driver) of the second moving body.

2.1.4. Actuator Placement

Figure 4A:
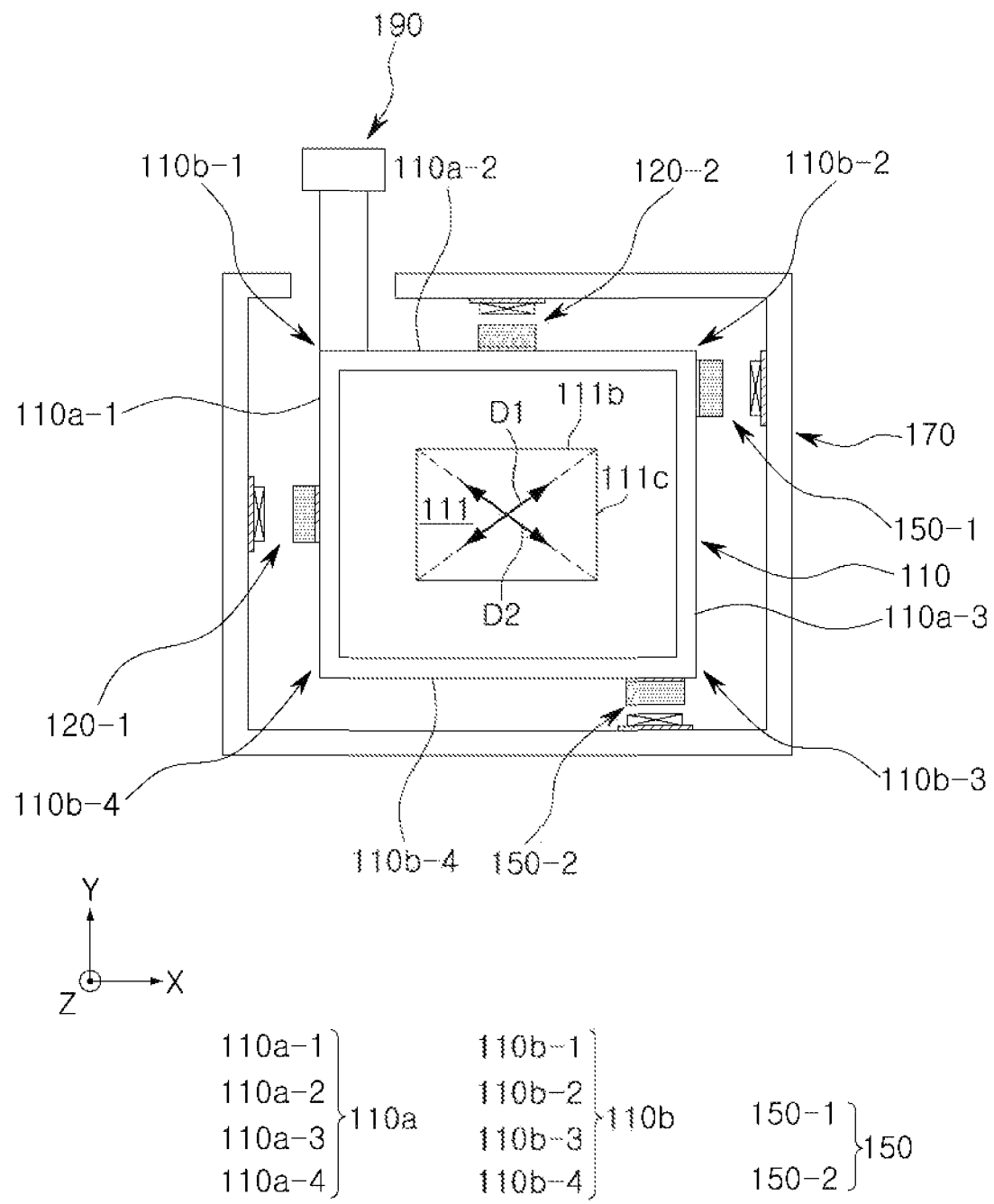
FIGS. 4A and 4B illustrate an arrangement of a first OIS driver and a second OIS driver according to an example embodiment.
Figure 4B:
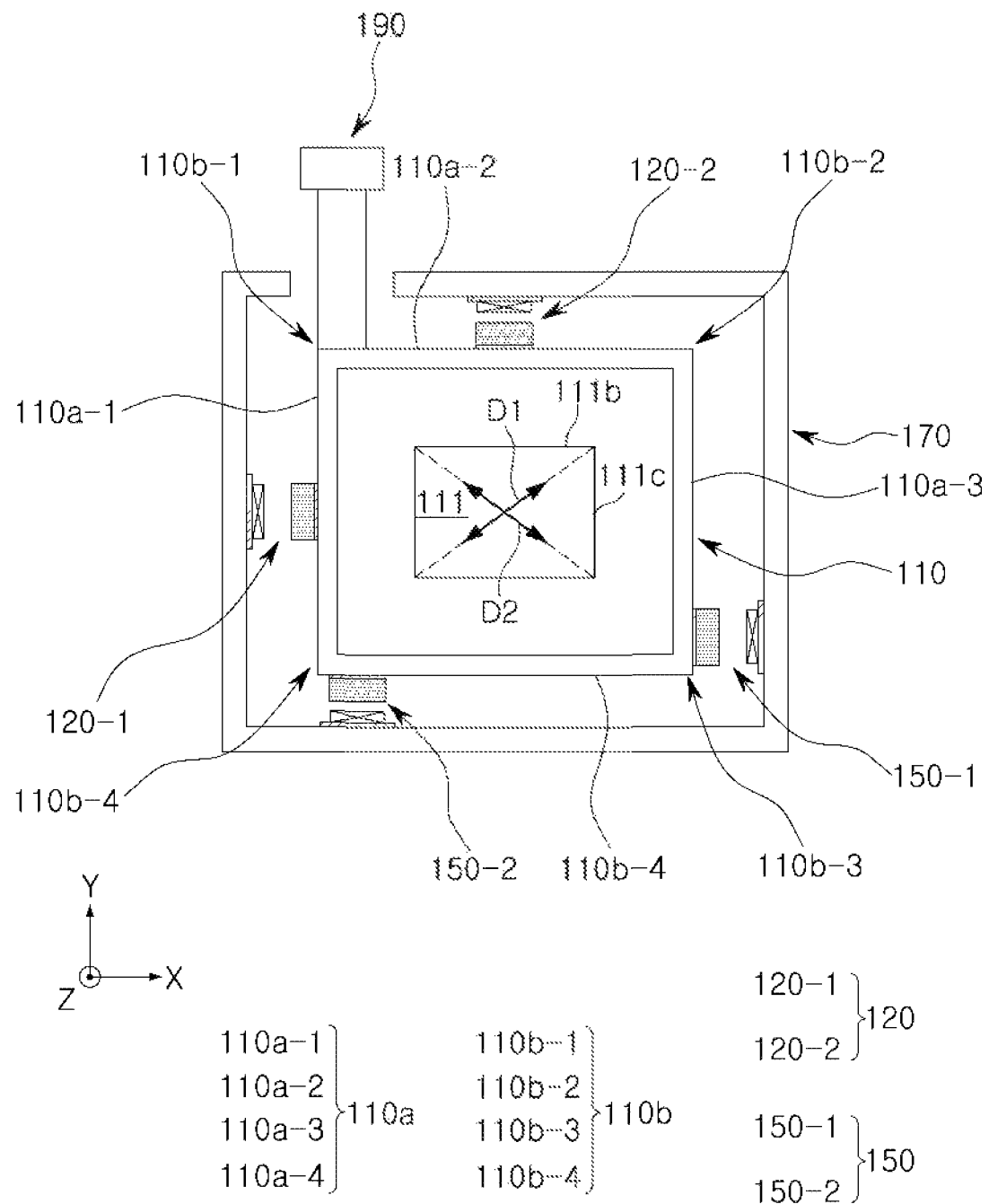

FIGS. 4A and 4B illustrate an arrangement of a first OIS driver and a second OIS driver according to an example embodiment.

Referring to FIG. 2B, FIG. 4A, and FIG. 4B, the second movable body 110 may include four side surfaces 110*a*-1, 110*a*-2, 110*a*-3, 110*a*-4 that form a quadrangle, and two of the four side surfaces 110*a*-1, 110*a*-2, 110*a*-3, and 110*a*-4 adjacent to each other form corners.

The second movable body 110 may include a first side surface 110*a*-1, a second side surface 110*a*-2, a third side surface 110*a*-3, and a fourth side surface 110*a*-4 in a clockwise direction. A first corner 110*b*-1 is formed at the boundary between the first side surface 110*a*-1 and the second side surface 110*a*-2, a second corner 110*b*-2 is formed at the boundary between the second side surface 110*a*-2 and the third side surface 110*a*-3, a third corner 110*b*-3 is formed between the third side surface 110*a*-3 and the fourth side surface 110*a*-4, and a fourth corner 110*b*-4 is formed between the fourth side surface 110*a*-4 and the first side surface 110*a*-1. The side surface 110*a* of the second movable body 110 may be a side surface of the sensor holder 113.

In one example, the four side surfaces (110*a*-1, 110*a*-2, 110*a*-3, 110*a*-4) are parallel to the horizontal side (111*b*) or the vertical side (111*c*) of the image sensor 111, and the four corners 110*b* may be positioned in the diagonal directions D1 and D2 of the image sensor.

The first actuator 120 and the second actuator 150 may be respectively disposed on different sides of the four side surfaces 110*a*-1, 110*a*-2, 110*a*-3, and 110*a*-4. For example, the 1-1 actuator 120-1, the 1-2 actuator 120-2, the 2-1 actuator 150-1, and the 2-2 actuator 150-2 are disposed at the first side surface 110*a*-1, the second side surface 110*a*-2, the third side surface 110*a*-3, and the fourth side surface 110*a*-4, respectively.

Referring to FIGS. 4A and 4B, the second actuator 150 constituting the second OIS driver may be located close to the corner 110*b* of the second movable body 110. By disposing the second actuator 150 close to the corner 110*b*, the second movable body 110 may rotate efficiently.

Referring to FIG. 4A, the 1-1 actuator 120-1 and the 1-2 actuator 120-2 constituting the first OIS driver are located in the central portion of a first side surface 110*a*-1 and a second side surface 110*a*-2. The 2-1 actuator 150-1 and the 2-2 actuator 150-2 constituting the second OIS driver are disposed on the third side surface 110*a*-3 and the fourth side surface 110*a*-4, respectively. The 2-1 actuator 150-1 and the 2-2 actuator 150-2 may be disposed adjacent to the second corner 110*b*-2 and the third corner 110*b*-3, respectively.

Referring to FIG. 4B, the 2-1 actuator 150-1 and the 2-2 actuator 150-2 constituting the second OIS driver are disposed on a third side surface 110*a*-3 and a fourth side surface 110*a*-4, respectively. The 2-1 actuator 150-1 and the 2-2 actuator 150-2 may be disposed adjacent to the third corner 110*b*-3 and the fourth corner 110*b*-4, respectively.

2.2. Tilting OIS
2.2.1. Structure

Referring to FIG. 2A, the sensor shifting module 100 may include a third OIS driver. The sensor shifting module 100 may include a third OIS driver that moves the second movable body 110 with respect to the fixed body 170. The third OIS driver may rotate the second movable body 110 with respect to the fixed body 170, based on an axis perpendicular to the optical axis O (e.g., the first axis A1 or the second axis A2 in FIG. 2B). Shake compensation may be implemented by translating the image sensor 111 in a direction perpendicular to the optical axis O, but due to a very small size of a mobile camera, the mobile cameras have a very small translational range. Accordingly, in the case in which the degree of shake is relatively great, the correction amount may not reach the shake. The third OIS driver may correct the shake by tilting the image sensor 111, and may provide good quality shake correction even for relatively large shakes.

The first movable body 130 may be movably disposed inside the fixed body 170. The second movable body 110 may move with respect to the fixed body 170 by the third OIS driver. The image sensor 111 may be coupled to the second movable body 110. The image sensor 111 may be movably coupled to the first movable body 130. For example, the image sensor 111 may be coupled to the second movable body 110, and the second movable body 110 may be movably coupled to the first movable body 130. The second movable body 110 may move with respect to the fixed body 170 by the first OIS driver or the second OIS driver.

2.2.2. Third Actuator (Tilting)

Referring to FIGS. 2A and 2B, the third OIS driver includes a third actuator 160 disposed between the fixed body 170 and the second movable body 110. The third actuator 160 may include a third driving magnet 161 coupled to the second movable body 110, and a third driving coil 162 coupled to the fixed body 170 to face the third driving magnet 161.

In an example, the third actuator 160 may further include a yoke 163. The yoke 163 may be disposed on one side of the third driving magnet 161 and/or the third driving coil 162.

In an example, the third driving magnet 161 may be the first driving magnet 121 of the first OIS driver or the second driving magnet 151 of the second OIS driver. For example, the first driving magnet 121 or the second driving magnet 151 may partially constitute the third OIS driver. For example, at least one or more of the 1-1 driving magnet 121-1, the 1-2 driving magnet 121-2, the 2-1 driving magnet 151-1, and the 2-2 driving magnet 151-2 may function as the third driving magnet 161. Accordingly, the component described as the third driving magnet 161 in this document may be understood as the first driving magnet 121 or the second driving magnet 151.

The third OIS driver may include a plurality of third actuators 160, and each of the third actuators 160 may include a third driving magnet 161 and a third driving coil 162. For example, referring to FIG. 2B, the third OIS driver may include four third actuators corresponding to the 1-1 actuator 120-1, the 1-2 actuator 120-2, the 2-1 actuator 150-1, and the 2-2 actuator 150-2, respectively.

In one example, the third actuator 160 may include a 3-1 actuator 160-1, a 3-2 actuator 160-2, a 3-3 actuator 160-3, and a 3-4 actuator 160-4.

Referring to FIG. 2B, the 3-1 actuator 160-1 includes a 3-1 driving magnet 161-1 and a 3-1 driving coil 162-1. The 3-2 actuator 160-2 includes a 3-2 driving magnet 161-2 and a 3-2 driving coil 162-2. The 3-3 actuator 160-3 includes a 3-3 driving magnet 161-3 and a 3-3 driving coil 162-3. The 3-4 actuator 160-4 includes a 3-4 driving magnet 161-4 and a 3-4 driving coil 162-4.

The 1-1 driving magnet 121-1, the 1-2 driving magnet 121-2, the 2-1 driving magnet 151-1, and the 2-2 driving magnet 151-2 may function as drive magnets 161-1, 161-2, 161-3, and 161-4 of the 3-1 actuator 160-1, the 3-2 actuator 160-2, the 3-3 actuator 160-3, and the 3-4 actuator 160-4, respectively. The 3-1 driving coil 162-1, the 3-2 driving coil 162-2, the 3-3 driving coil 162-3, and the 3-4 driving coil 162-4 may be disposed opposite to the 1-1 driving magnet 121-1, the 1-2 driving magnet 121-2, the 2-1 driving magnet 151-1, and the 2-2 driving magnet 151-2, respectively.

The third OIS driver may rotate the second movable body 110 based on the first axis A1 and the second axis A2. The first axis A1 and the second axis A2 may be perpendicular to the optical axis and cross each other. For example, the first axis A1 may be parallel to the Y axis and the second axis A2 may be parallel to the X axis.

The 3-1 actuator 160-1 or the 3-3 actuator 160-3 may provide a moment in the direction of the first axis A1 to the second movable body 110. When a current is applied to the 3-1 driving coil 162-1, an attractive force or a repulsive force is generated between the 3-1 driving coil 162-1 and the 1-1 driving magnet 121-1, such that the second movable body 110 may be inclined with respect to the fixed body 170 (or the first movable body 130), based on the first axis A1 perpendicular to the optical axis. When a current is applied to the 3-3 driving coil 162-3, attractive force or repulsive force is generated between the 3-3 driving coil 162-3 and the 2-1 driving magnet 151-1, such that the second movable body 110 is inclined with respect to the fixed body 170 (or the first movable body 130) based on the first axis A1, perpendicular to the optical axis.

The 3-2 actuator 160-2 and the 3-4 actuator 160-4 may provide a moment in the second axis A2 direction to the second movable body 110. When a current is applied to the 3-2 driving coil 162-2, attractive or repulsive force is generated between the 3-2 driving coil 162-2 and the 1-2 driving magnet 121-2, thereby inclining the second movable body 110 with respect to the fixed body 170 (or the first movable body 130), based on the second axis A2 perpendicular to the optical axis. When a current is applied to the 3-4 driving coil 162-4, an attractive force or a repulsive force is generated between the 3-4 driving coil 162-4 and the 2-2 driving magnet 151-2, thereby inclining the second movable body 110 with respect to the fixed body 170 (or the first movable body 130) based on the second axis A2 perpendicular to the optical axis.

In an example, a 3-1 driving coil 162-1, a 3-2 driving coil 162-2, a 3-3 driving coil 162-3, or a 3-4 driving coil 162-4 may be omitted. In an example, any one of the 3-1 actuator 160-1 and the 3-3 actuator 160-3 providing the Y-direction moment may be omitted. In an example, any one of the 3-2 actuator 160-2 and the 3-4 actuator 160-4 providing the moment in the X direction may be omitted. For example, the third OIS driver may include only the 3-1 actuator 160-1 and the 3-2 actuator 160-2. As another example, the third OIS driver may include only the 3-3 actuator 160-3 and the 3-4 actuator 160-4.

2.2.3. Ball Guide

In an example, the third OIS driver may include a tilt guide ball 164 disposed between the second movable body 110 and the first movable body 130. The tilt guide ball 164 may provide a tilt center of the second movable body 110 with respect to the first movable body 130. For example, the second movable body 110 may tilt around the tilt guide ball 164. Referring to FIG. 2A, the lower surface 110d of the second movable body 110 and the upper surface 132 of the first movable body 130 face each other in the optical axis O direction, and grooves for partially accommodating the tilt guide ball 164 may be formed in the lower surface 110d of the second movable body 110 and the upper surface 132 of the first movable body 130.

2.2.4. Pulling

FIG. 2C illustrates a lower surface of the first movable body according to an example embodiment. Referring to FIGS. 2A and 2C, in an example, the third OIS driver may include pulling units disposed on the second movable body 110 and the first movable body 130, respectively, and opposite to each other in a direction parallel to the optical axis (O). The pulling units may include a first magnetic member 165 and a second magnetic member 166. A magnetic attraction is generated between the first magnetic member 165 and the second magnetic member 166, thereby pulling the second movable body 110 to the upper surface 132 of the first movable body 130. Accordingly, the tilt guide ball 164 may maintain contact with the first movable body 130 and the second movable body 110, which helps the second movable body 110 to smoothly tilt with respect to the first movable body 130.

One of the first magnetic member 165 or the second magnetic member 166 may be a magnet, and the other may be a magnet or a yoke. For example, the first magnetic member 165 may be a magnet, and the second magnetic member 166 may be a yoke.

Referring to FIG. 2C, a plurality of second magnetic members 166 may be arranged around the tilt guide ball 164. A plurality of first magnetic members 165 corresponding to the plurality of second magnetic members 166 may be arranged on the upper surface 132 of the first movable body 130.

In an example, the third OIS driver may include a third position sensor configured to measure the tilt amount of the second movable body 110. The third position sensor may be a Hall sensor or a magnetoresistance sensor.

In an example, the third position sensor may be disposed inside the third driving coil 162 and may face the first driving magnet 121 or the second driving magnet 151.

In an example, the third OIS driver may include a sensing magnet facing the third position sensor. In one example, one of the first magnetic member 165 and the second magnetic member 166 may be a magnet, and the other may be a yoke, and a magnetic member that is a magnet may function as a sensing magnet. For example, referring to FIG. 2A, the first magnetic member 165 may be a magnet, the second magnetic member 166 may be a yoke, the second magnetic member 165 includes a penetrating portion on the inner side, and a third position sensor may be disposed in the penetrating portion.

2.3. Motion 2.3.1. Translation Motion

Figure 5A:
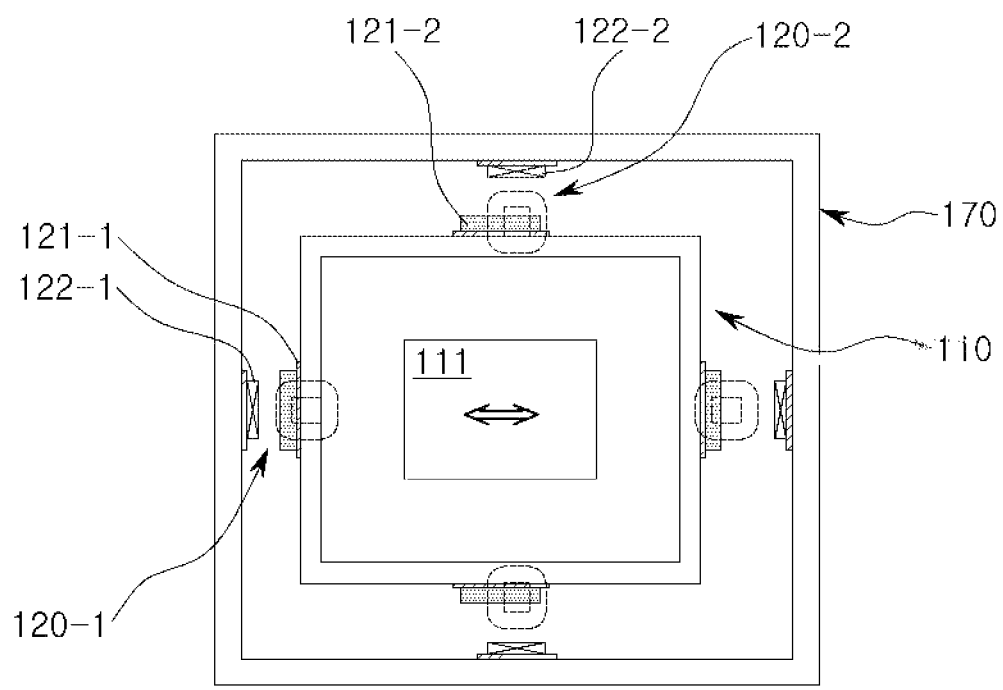
FIGS. 5A and 5B illustrate the motion of the second movable body due to the first OIS driver according to one or more example embodiments.
Figure 5B:
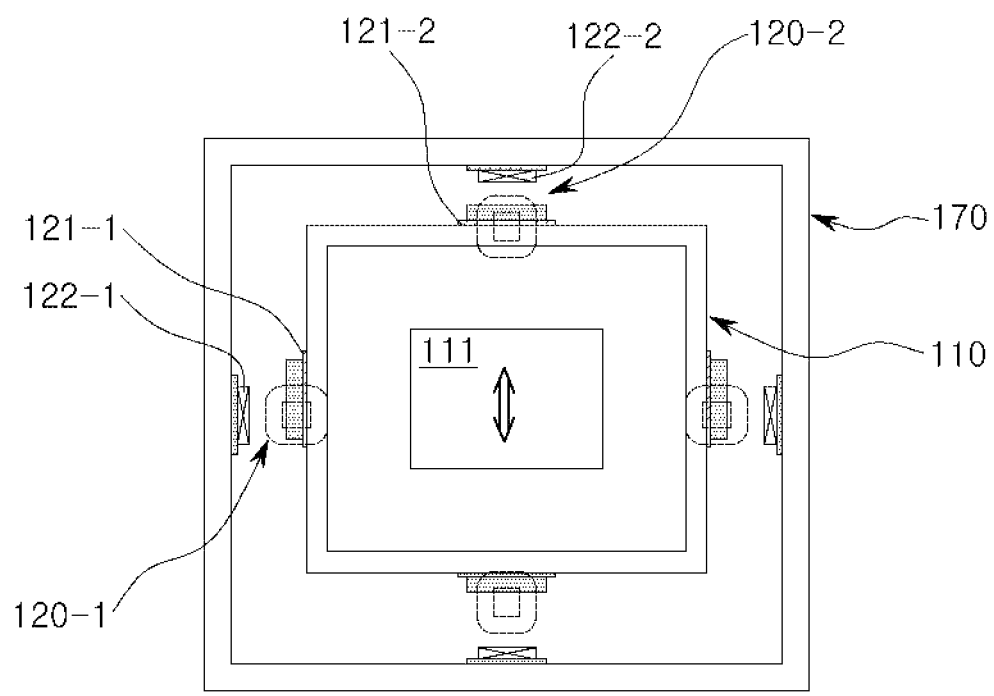

FIGS. 5A and 5B illustrate the motion of the second movable body due to the first OIS driver according to one or more example embodiments.

Referring to FIG. 5A, the 1-1 actuator 120-1 may move the second movable body 110 in the X direction with respect to the fixed body 170. When a current is applied to the 1-1 driving coil 122-1, attractive force or repulsive force in the X direction may occur between the 1-1 driving coil 122-1 and the 1-1 driving magnet 121-1, thereby moving the second movable body 110 (or the image sensor 111) in the −X direction or the +X direction.

Referring to FIG. 5B, the 1-2 actuator 120-2 may move the second movable body 110 with respect to the fixed body 170 in the Y direction. When a current is applied to the 1-2 driving coil 122-2, an attractive force or a repulsive force in the Y direction may occur between the 1-2 driving coil 122-2 and the 1-2 driving magnet 121-2, thereby moving the second movable body 110 (or the image sensor 111) in the −Y direction or the +Y direction.

2.3.2. Rolling Motion

Figure 6A:
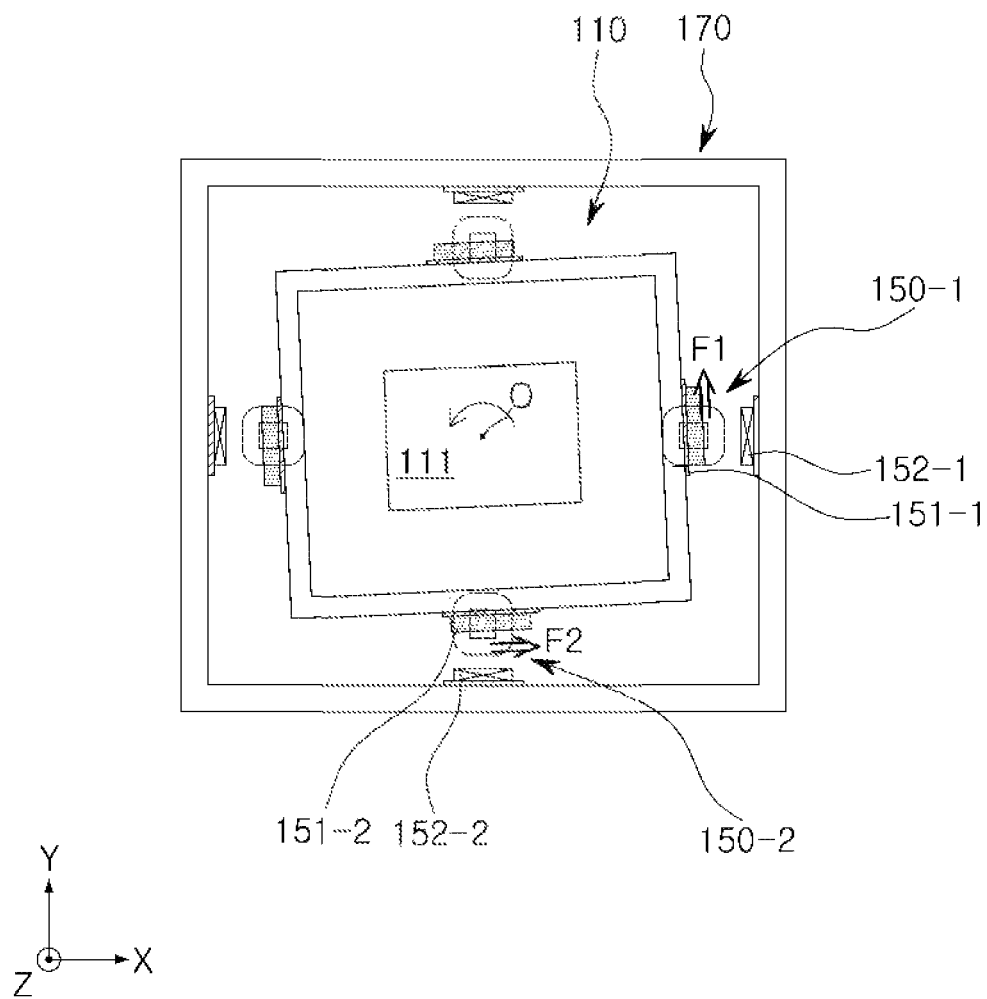
FIGS. 6A and 6B illustrate rolling of the second movable body due to the second OIS driver according to one or more example embodiments.
Figure 6B:
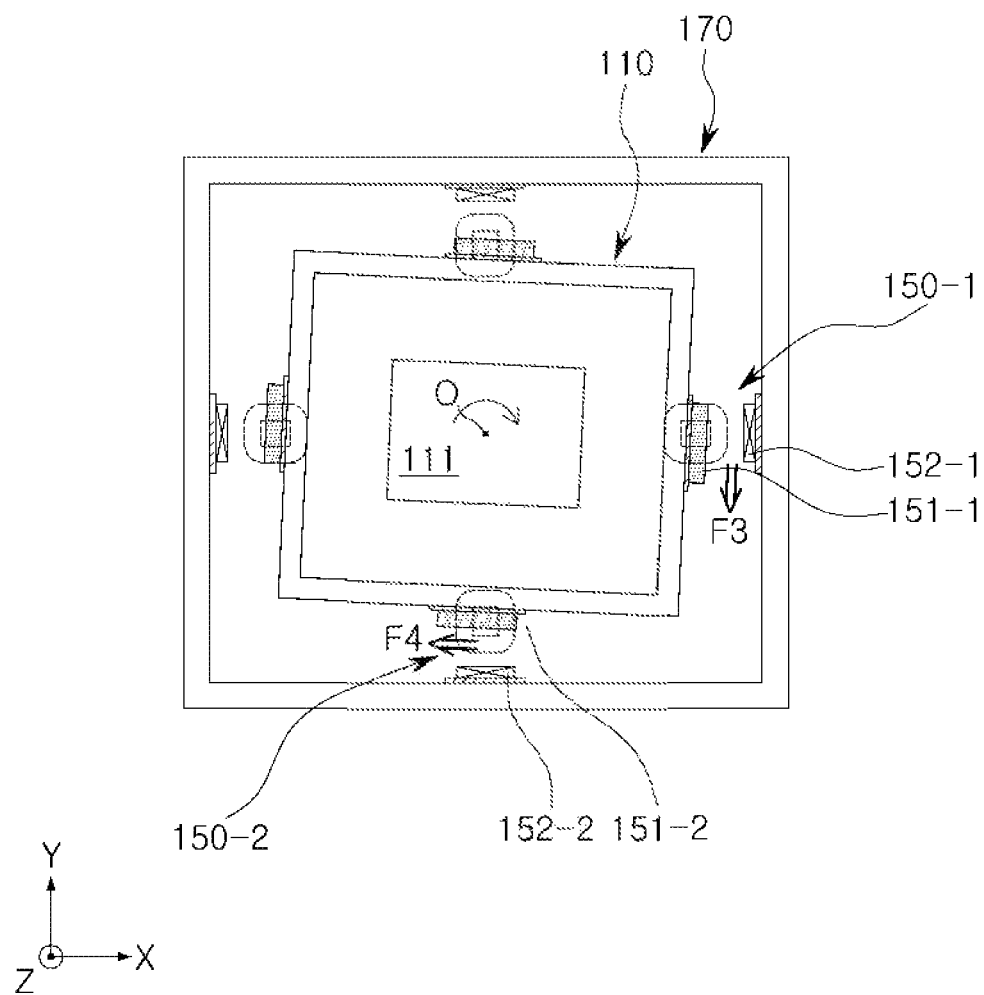

FIGS. 6A and 6B illustrate rolling of the second movable body 110 due to the second OIS driver according to one or more example embodiments.

Referring to FIG. 6A, the 2-1 actuator 150-1 and the 2-2 actuator 150-2 may rotate the second movable body 110 counterclockwise with respect to the fixed body 170. The 2-1 actuator 150-1 and the 2-2 actuator 150-2 may provide a counterclockwise moment to the second movable body 110. For example, a Lorentz force is generated between the 2-1 driving magnet 151-1 and the 2-1 driving coil 152-1, and accordingly, a force F1 may act on the 2-1 driving magnet 151-1. A Lorentz force is generated between the 2-2 driving magnet 151-2 and the 2-2 driving coil 152-2, and accordingly, a force F2 may act on the 2-2 driving magnet 151-2. F1 and F2 may rotate the second movable body 110 in a counterclockwise direction.

Referring to FIG. 6B, the 2-1 actuator 150-1 and the 2-2 actuator 150-2 may rotate the second movable body 110 clockwise with respect to the fixed body 170. The 2-1 actuator 150-1 and the 2-2 actuator 150-2 may provide a clockwise moment to the second movable body 110. For example, a Lorentz force is generated between the 2-1 driving magnet 151-1 and the 2-1 driving coil 152-1, and accordingly, the force F3 may act on the 2-1 driving magnet 151-1. A Lorentz force is generated between the 2-2 driving magnet 151-2 and the 2-2 driving coil 152-2, and accordingly, a force F4 may act on the 2-2 driving magnet 151-2. F3 and F4 may rotate the second movable body 110 clockwise.

2.3.3. Tilting Movement

Figure 7:
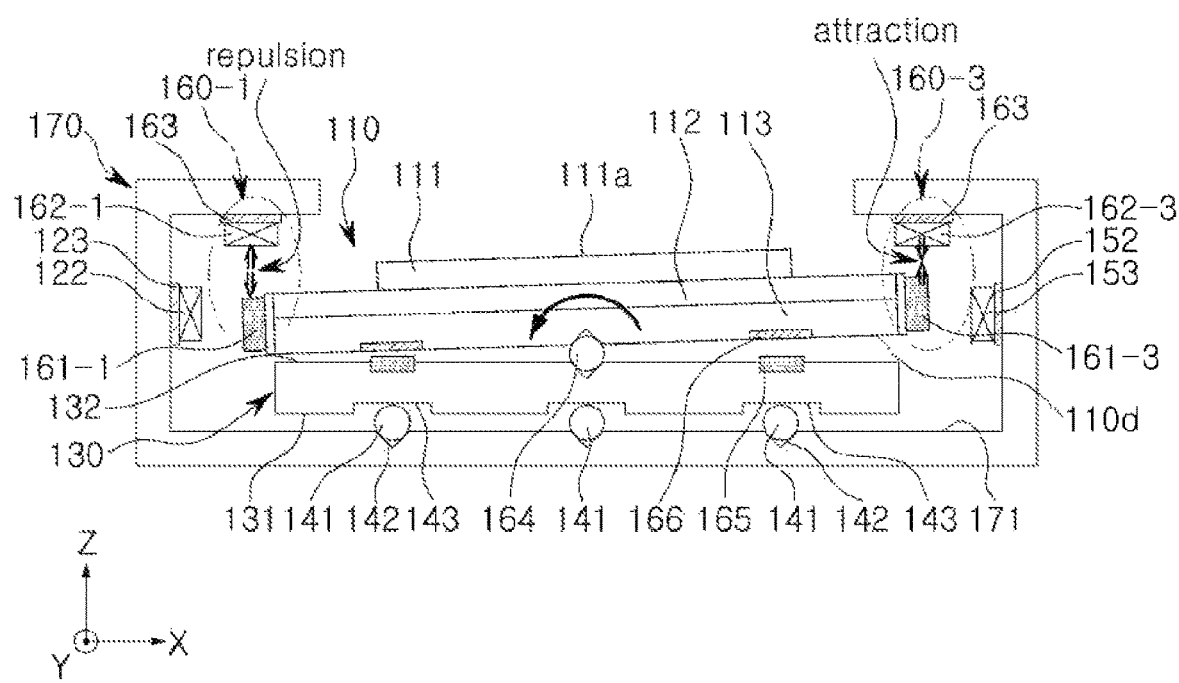
FIGS. 7 and 8 illustrate tilting of the first movable body due to the third OIS driver according to one or more example embodiments.
Figure 8:
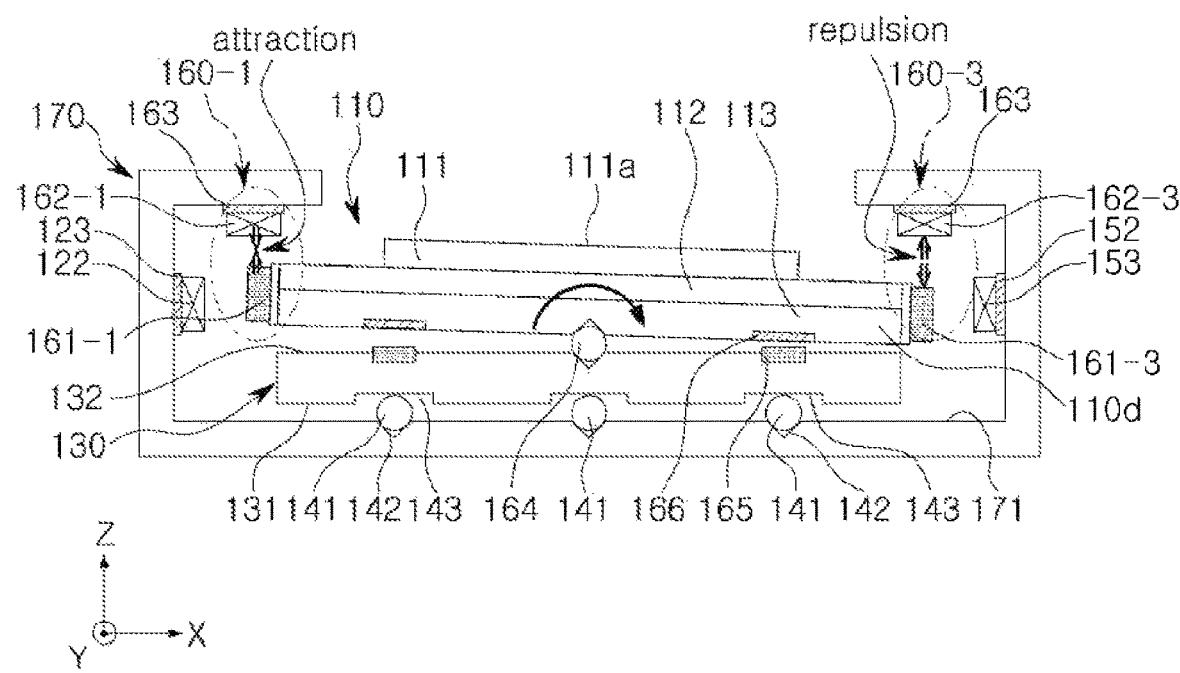

FIGS. 7 and 8 illustrate tilting of the first movable body 130 according to one or more example embodiments.

Referring to FIGS. 7 and 8, the third OIS driver may rotate the image sensor based on an axis perpendicular to the optical axis. For example, the third OIS driver may rotate the second movable body 110 clockwise or counterclockwise around the tilt guide ball 164.

In FIGS. 7 and 8, the 3-1 actuator 160-1 and the 3-3 actuator 160-3 which are responsible for the rotation of the first movable body 130 in the first axis A1 direction (or the Y-axis direction) are illustrated. Although not illustrated, the second movable body 110 may rotate based on various axes perpendicular to the optical axis (e.g., the first axis A1 or the second axis A2 in FIG. 2B), by a plurality of third actuators including the 3-1 actuator 160-1 or the 3-3 actuator 160-3.

Referring to FIG. 7, as a current is applied to the 3-1 driving coil 162-1, a repulsion is generated between the 3-1 driving magnet 161-1 and the 3-1 driving coil 162-1, thereby rotating the second movable body 110 in a counterclockwise direction. Additionally or alternatively, as a current is applied to the 3-3 driving coil 162-3, an attraction is generated between the 3-3 driving magnet 161-3 and the 3-3 driving coil 162-3, thereby rotating the second movable body 110 in a counterclockwise direction with respect to the fixed body 170 (or the first movable body 130).

Referring to FIG. 8, as a current is applied to the 3-1 driving coil 162-1, the attractive force between the 3-1 driving magnet 161-1 and the 3-1 driving coil 162-1 is generated, thereby rotating the second movable body 110 in a clockwise direction. Additionally or alternatively, as a current is applied to the 3-3 driving coil 162-3, a repulsion occurs between the 3-3 driving magnet 161-3 and the 3-3 driving coil 162-3, thereby rotating the second movable body 110 clockwise with respect to the fixed body 170 (or the first movable body 130).

In an example, one of the 3-1 actuator 160-1 or the 3-3 actuator 160-3 in the third OIS driver may be omitted. This is because each of the 3-1 actuator 160-1 and the 3-3 actuator 160-3 may rotate the second movable body 110 clockwise or counterclockwise.

3. Sensor Shift AF

Figure 9:
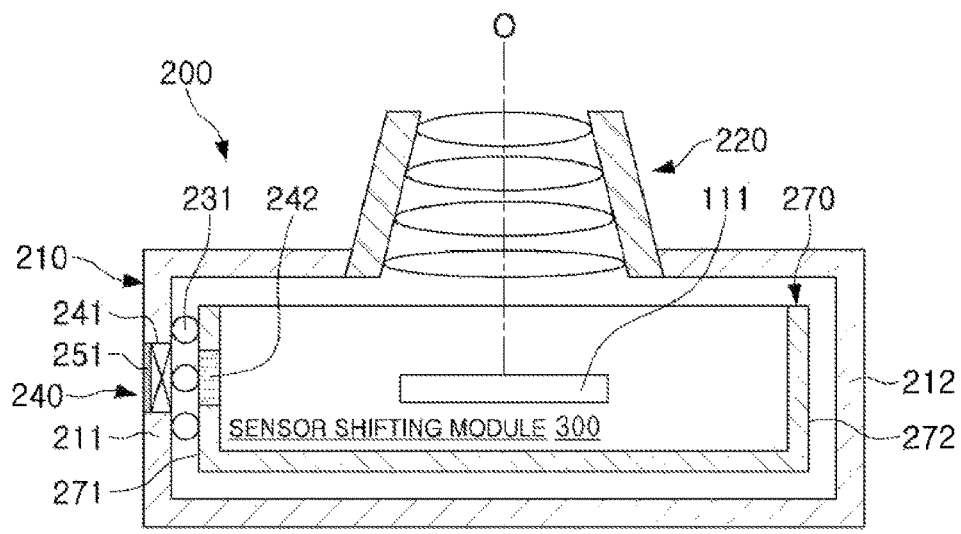
FIG. 9 illustrates a camera module according to a first example embodiment.
Figure 10:
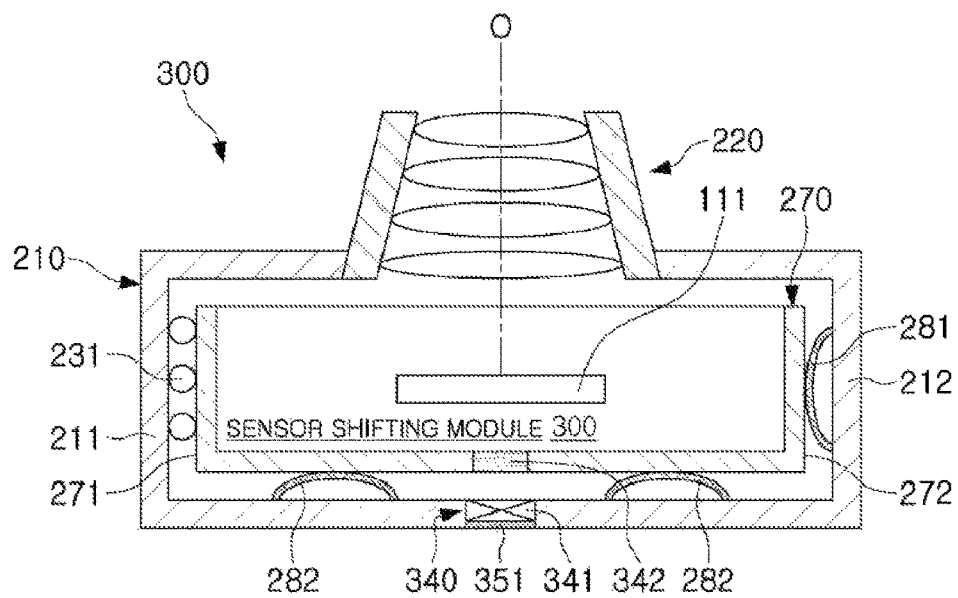
FIG. 10 illustrates a camera module according to a second example embodiment.

FIG. 9 illustrates a camera module 200 according to a first example embodiment. FIG. 10 illustrates a camera module 300 according to a second example embodiment.

Referring to FIGS. 9 and 10, in one example, the camera modules 200 and 300 may include a housing 210, a lens barrel 220, an image sensor 111, an AF carrier 270, and an AF driver. The lens barrel 220 includes at least one lens therein, and is coupled to the housing 210. The image sensor 111 may be movably coupled to the AF carrier 270. For example, the AF carrier 270 and the image sensor 111 may correspond to one or more embodiments of the fixed body 170 and the image sensor 111 of FIGS. 2A to 8.

A sensor shifting module may be disposed inside the AF carrier 270. The sensor shifting module may include a portion or all of the components constituting the sensor shifting module 100 described with reference to FIGS. 2A to 8. For example, the sensor shifting module 300 may include a driver for moving the image sensor 111 in a direction perpendicular to the optical axis O with respect to the AF carrier 270, or for rotating the same based on an axis parallel to the optical axis O, or rotating the same based on an axis perpendicular to the optical axis O.

The AF driver may include a ball guide structure, a pulling means, and an AF actuator. The AF driver of FIGS. 9 and 10 may correspond to the second AF driver of FIG. 1.

Referring to FIG. 9, the image sensor 111 may be mounted on the AF carrier 270, and the AF carrier 270 may move in the optical axis O direction with respect to the housing 210. A ball member 231 may be disposed between the AF carrier 270 and the housing 210. The ball member 231 may include a plurality of balls.

The ball member 231 may be disposed between the first sidewall 271 of the AF carrier 270 and the first sidewall 211 of the housing 210. One or more guide grooves for partially accommodating the ball member 231 may be formed in the first sidewall 271 of the AF carrier 270 and the first sidewall 211 of the housing 210. The one or more guide grooves may extend in a direction parallel to the optical axis O and guide the movement of the AF carrier 270 in the optical axis O direction.

An AF actuator 240 may be disposed between the AF carrier 270 and the housing 210. The AF actuator 240 may include an AF coil 241 and an AF magnet 242 facing each other. In an example, the AF coil 241 and the AF magnet 242 may be disposed in the housing 210 and the AF carrier 270, respectively. In another example, the AF coil 241 and the AF magnet 242 may be respectively disposed on the AF carrier 270 and the housing 210.

In an example, the AF actuator 240 may include an AF coil 241 and an AF magnet 242 facing each other in a direction perpendicular to the optical axis O (e.g., the X direction). When a current flows through the AF coil 241, the AF carrier 270 may move in the optical axis O direction with respect to the housing 210 by electromagnetic interaction (e.g., Lorentz force) between the AF coil 241 and the AF magnet 242.

A means for pulling the AF carrier 270 to the sidewall of the housing 210 may be disposed between the AF carrier 270 and the housing 210. In one example, referring to FIG. 9, a pulling yoke 251 may be disposed on one side of the AF coil 241, and the AF carrier 270 may be pulled toward the first sidewall 211 of the housing 210 by the attractive force between the pulling yoke 251 and the AF magnet 242. Accordingly, the ball member 231 maintains contact with the AF carrier 270 and the housing 210, and accordingly, the AF carrier 270 may move smoothly in the optical axis (O) direction.

Referring to FIG. 10, in an example, the AF actuator 340 may be disposed below the AF carrier 270. For example, the AF magnet 342 may be disposed on the lower surface of the AF carrier 270, The AF coil 341 may be disposed on the bottom surface of the housing 210. In an example, the AF magnet 342 and the AF coil 341 may face each other in a direction parallel to the optical axis O (e.g., the Z direction). When a current flows through the AF coil 341, an attractive force or a repulsive force may be generated between the AF coil 341 and the AF magnet 342, thereby moving the AF carrier 270 in the optical axis (O) direction.

Referring to FIG. 10, a first elastic member 281 for pushing the AF carrier 270 to the first sidewall 211 of the housing 210 may be disposed between the AF carrier 270 and the housing 210. The first elastic member 281 for pushing the AF carrier 270 to the first sidewall 211 of the housing 210 may be disposed between a second sidewall 272 of the AF carrier 270 and a second sidewall 212 of the housing 210. The ball member 231 may be disposed on one side of the AF carrier 270, and a first elastic member 281 may be disposed on the other side of the AF carrier 270. The first elastic member 281 may be disposed between the AF carrier 270 and the housing 210, and the AF carrier 270 may be pushed in the direction in which the ball member 231 is located. Accordingly, the ball member 231 maintains contact with the AF carrier 270 and the housing 210, and accordingly, the AF carrier 270 may move smoothly in the optical axis (O) direction. The first elastic member 281 may be a leaf spring. For example, the first elastic member 281 may be provided in the form of a plate spring convexly bent toward the AF carrier 270 (e.g., in the +Z direction).

Referring to FIG. 10, a yoke 351 may be disposed on one side of the AF coil 341, and a magnetic attraction occurs between the yoke 351 and the AF magnet 342, thereby pulling the AF carrier 270 to the bottom surface of the housing 210. In an example, the AF driver may include a second elastic member 282 disposed below the AF carrier 270. The second elastic member 282 may support the AF carrier 270. When the AF carrier 270 moves in the optical axis (O) direction from the initial position, the second elastic member 282 may be deformed to provide a restoring force to return the AF carrier 270 to its initial position. The second elastic member 282 may be provided in the form of a leaf spring. For example, referring to FIG. 10, the second elastic member 282 may be a leaf spring bent convexly toward the AF carrier 270. The first elastic member 281 and/or the second elastic member 282 of FIG. 10 may also be applied to the camera module 200 illustrated in FIG. 9.

4. Example of Adding Camera Module

Figure 11:
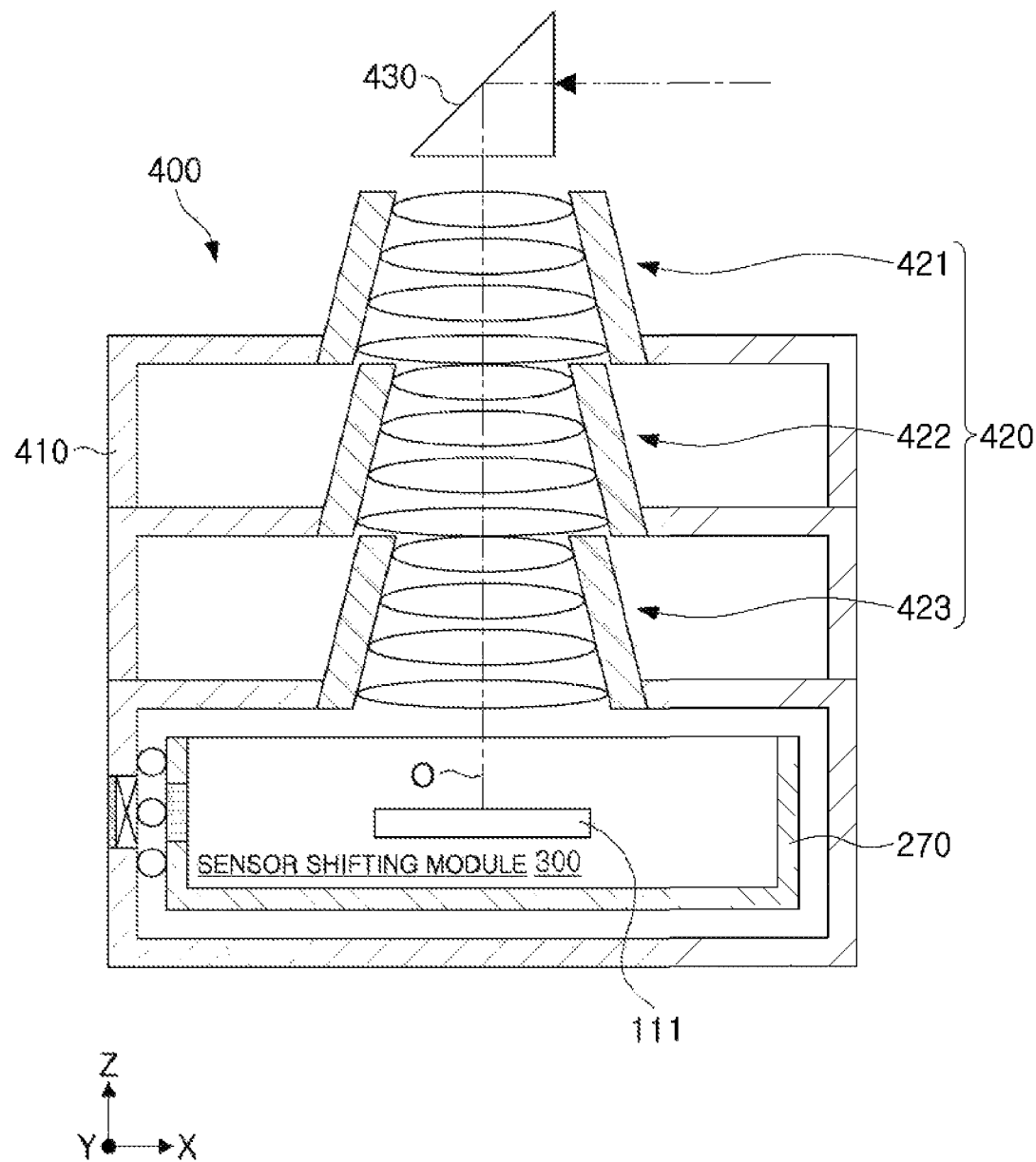
FIGS. 11 and 12 illustrate camera modules according to third and fourth example embodiments.
Figure 12:
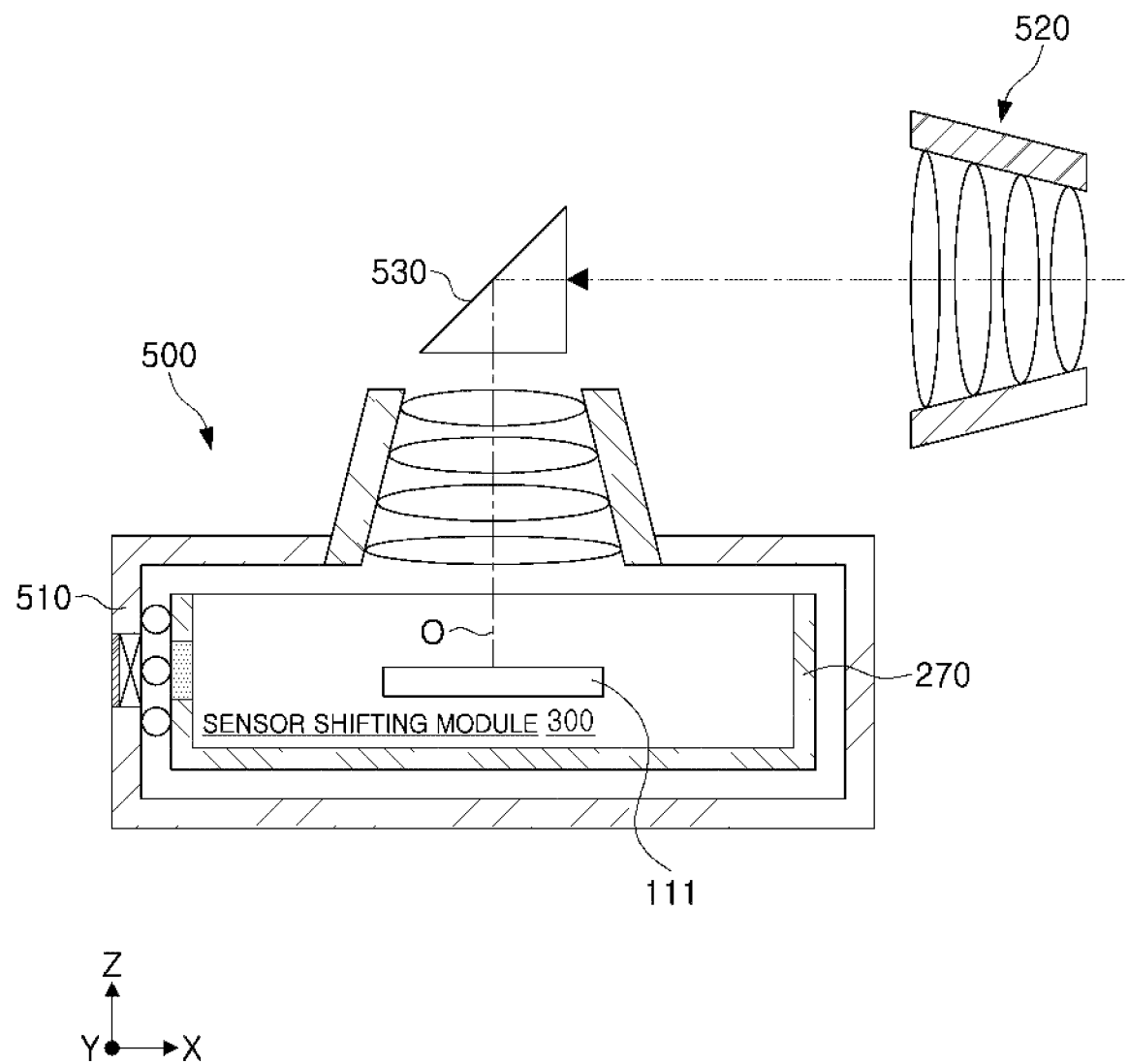

FIGS. 11 and 12 illustrate camera modules 400 and 500 according to third and fourth example embodiments.

Referring to FIG. 11, the camera module 400 may include a plurality of lens barrels 420. For example, the camera module 400 may include three lens barrels 421, 422, and 423. The lens barrels 420 may be fixedly coupled to the housing 410. The camera module 400 may include an optical path changing member 430 disposed on the object side of the frontmost lens barrel 421. The optical path changing member 430 converts the path of light, and may be, for example, a prism or a mirror. The AF carrier 270 on which the image sensor 111 is mounted may be movably disposed in the housing 410 in the optical axis direction, and descriptions related to the internal configuration of the AF carrier 270 and AF driving are the same as in FIGS. 9 and 10.

Referring to FIG. 12, the optical path changing member 530 may be disposed in front of the image sensor 111, and a lens barrel 520 may be disposed on one side of the optical path changing member 530. The light passing through the lens barrel 520 may be reflected by the optical path changing member 530 to reach the image sensor 111. The AF carrier 270 on which the image sensor 111 is mounted may be movably disposed in the housing 510 in the optical axis direction, and descriptions related to the internal configuration of the AF carrier 270 and AF driving are the same as in FIGS. 9 and 10.

As set forth above, according to an example, the camera may provide an effective autofocus function and an optical image stabilization function even with a small amount of power. Alternatively, according to an example, an excellent shake correction function may be implemented by driving the image sensor in various directions.

The AF drivers, first AF driver 23, second AF driver 13, OIS drivers, first, second, and third OIS drivers, OIS driver 12, sensors, sensor shifting modules, sensor shifting modules 10, 100, 300, image sensors, actuators, first actuators 120, second actuators 150, and third actuators 160, first, second, and third position sensors, processors, memories, and other apparatuses, devices, units, modules, and components described herein with respect to FIGS. 1-12 are implemented by or representative of hardware components. Examples of hardware components that may be used to perform the operations described herein where appropriate include controllers, sensors, generators, drivers, memories, comparators, arithmetic logic units, adders, subtractors, multipliers, dividers, integrators, and any other electronic components configured to perform the operations described herein. In other examples, one or more of the hardware components that perform the operations described herein are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described herein. The hardware components may also access, manipulate, process, create, and store data in response to execution of the instructions or software. For simplicity, the singular term "processor" or "computer" may be used in the description of the examples described herein, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described herein are performed by computing hardware, for example, by one or more processors or computers, implemented as described above executing instructions or software to perform the operations described herein that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While specific examples have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
    a housing;
    a carrier, disposed in the housing, and configured to move in a first direction;
    a first body movably disposed inside the carrier;
    an image sensor disposed on the first body and comprising an imaging surface facing in the first direction; and
    supporting balls disposed between the carrier and the first body,
    wherein the first body is configured to move in a direction perpendicular to the first direction when supported by the supporting balls with respect to the carrier.

2. The camera module of claim 1, further comprising:
    an autofocus driver including an autofocus actuator moving the carrier in the first direction relative to the housing; and
    a ball member disposed between the carrier and the housing.

3. The camera module of claim 2, wherein the autofocus actuator comprises:
    an autofocus coil coupled to one of the housing and the carrier; and
    an autofocus magnet coupled to the other one of the carrier and the housing and facing the autofocus coil in a direction perpendicular to the first direction.

4. The camera module of claim 3, further comprising a yoke disposed on one side of the autofocus coil.

5. The camera module of claim 2, wherein the autofocus actuator is disposed below the carrier, and comprises an autofocus coil coupled to one of the housing and the carrier, and an autofocus magnet coupled to the other of the housing and the carrier and facing the autofocus coil in the first direction.

6. The camera module of claim 5, further comprising a first elastic member disposed between the carrier and the housing,
wherein the ball member is disposed on one side of the carrier, and the first elastic member is disposed on the other side of the carrier to push the carrier toward the ball member.

7. The camera module of claim 5, further comprising a second elastic member disposed between the lower portion of the carrier and the housing to support the carrier in the first direction.

8. The camera module of claim 1, further comprising:
a second body movably disposed on the first body, wherein the image sensor is disposed on the second body;
a first driver for moving the first body in a direction perpendicular to the first direction with respect to the carrier;
a second driver for rotating the second body with respect to the carrier about an axis parallel to the first direction; and
a third driver rotating the second body with respect to the first body about an axis perpendicular to the first direction.

9. The camera module of claim 8, wherein the third driver comprises a tilt guide ball disposed between the first body and the second body, wherein the tilt ball provides a tilt center of the second body with respect to the first body.

10. The camera module of claim 8, wherein the first body is disposed between the lower surface of the second body and the bottom surface of the carrier.

11. The camera module of claim 8, wherein the first driver comprises a first actuator, and the first actuator comprises a first driving magnet disposed on the second body, and a first driving coil disposed on the carrier in a direction perpendicular to the first direction and facing the first driving magnet.

12. The camera module of claim 11, wherein the second driver comprises a second actuator, wherein the second actuator comprises a second driving magnet disposed on the second body and a second driving coil disposed in the carrier to face the second driving magnet in a direction perpendicular to the first direction.

13. The camera module of claim 12, wherein the second body comprises four side surfaces forming a quadrangle, and the first driving magnet and the second driving magnet are respectively disposed on different side surfaces of the four side surfaces.

14. The camera module of claim 13, wherein the second body comprises a first side and a second side forming a corner, and the second driving magnet is disposed on the first side or the second side and is located close to the corner.

15. The camera module of claim 12, wherein the third driver comprises a third actuator, wherein the third actuator comprises a third driving magnet disposed on the second body, and a third driving coil disposed in the carrier to face the third driving magnet in the first direction.

16. The camera module of claim 15, wherein the third driving magnet is the first driving magnet or the second driving magnet.

17. The camera module of claim 16, wherein the third driver comprises a first magnetic member and a second magnetic member disposed on the first body and the second body, respectively, facing each other in the first direction.

18. A sensor shifting module comprising:
a carrier;
supporting balls disposed on the carrier;
a first body disposed on the supporting balls and movable in a plane;
a tilt guide ball disposed on the first body;
a second body disposed on the tilt guide ball and rotatable about a first direction perpendicular to the plane and rotatable about second and third directions perpendicular to the first direction; and
an image sensor disposed on the second body and comprising an imaging surface facing in the first direction.

19. A camera module comprising:
the sensor shifting module of claim 18;
a housing; and
a ball member,
wherein the carrier is movably disposed in the housing in the first direction, and
wherein the ball member is disposed between the carrier and the housing.

20. The camera module of claim 19, further comprising:
an autofocus actuator configured to move the carrier in the first direction relative to the housing;
a first actuator comprising a first magnet and configured to move the first body in a direction perpendicular to the first direction with respect to the carrier;
a second actuator comprising a second magnet and configured to rotate the second body with respect to the carrier about an axis parallel to the first direction; and
a third actuator comprising one or more of the first magnet and the second magnet and configured to rotate the second body with respect to the first body about an axis perpendicular to the first direction.

* * * * *